United States Patent [19]

Sadeck

[11] Patent Number: 4,623,109

[45] Date of Patent: Nov. 18, 1986

[54] LOW ALTITUDE PARACHUTE SYSTEM

[75] Inventor: James E. Sadeck, East Freetown, Mass.

[73] Assignee: The United States of America as represented by the Secretary of the Army, Washington, D.C.

[21] Appl. No.: 749,700

[22] Filed: Jun. 28, 1985

[51] Int. Cl.[4] .................. B64D 17/00; B64D 17/08
[52] U.S. Cl. ................................... 244/152; 244/142
[58] Field of Search ............... 244/152, 145, 142, 147, 244/149

[56] References Cited

U.S. PATENT DOCUMENTS

| | | | |
|---|---|---|---|
| 2,164,122 | 6/1939 | Pool | 244/152 |
| 2,358,417 | 9/1944 | Quilter et al. | 244/142 |
| 2,577,048 | 12/1951 | Taylor | 244/145 |
| 2,610,008 | 9/1952 | Smith | 244/152 |
| 3,385,539 | 5/1968 | Ewing et al. | 244/145 |

FOREIGN PATENT DOCUMENTS

| | | | |
|---|---|---|---|
| 281881 | 12/1927 | United Kingdom | 244/145 |
| 467884 | 6/1937 | United Kingdom | 244/152 |
| 516292 | 12/1939 | United Kingdom | 244/152 |

Primary Examiner—Galen Barefoot
Assistant Examiner—Lynn M. Fiorito
Attorney, Agent, or Firm—Lawrence E. Labadini; Mark Goldberg

[57] ABSTRACT

An annular ring parachute intended for low altitude deployment with a low rate of descent. This parachute comprises an annular ring parachute canopy having a central vent. Suspension lines are connected at one end to the outer edge of the canopy and at the other end to risers attached to a load-bearing harness. A restraining device is connected to the canopy which slows the opening of the central vent while the canopy inflates during deployment of the parachute. A pilot chute connected to the restraining means is adapted when inflated to apply a force to the restraining means to slow the opneing of the central vent.

12 Claims, 8 Drawing Figures

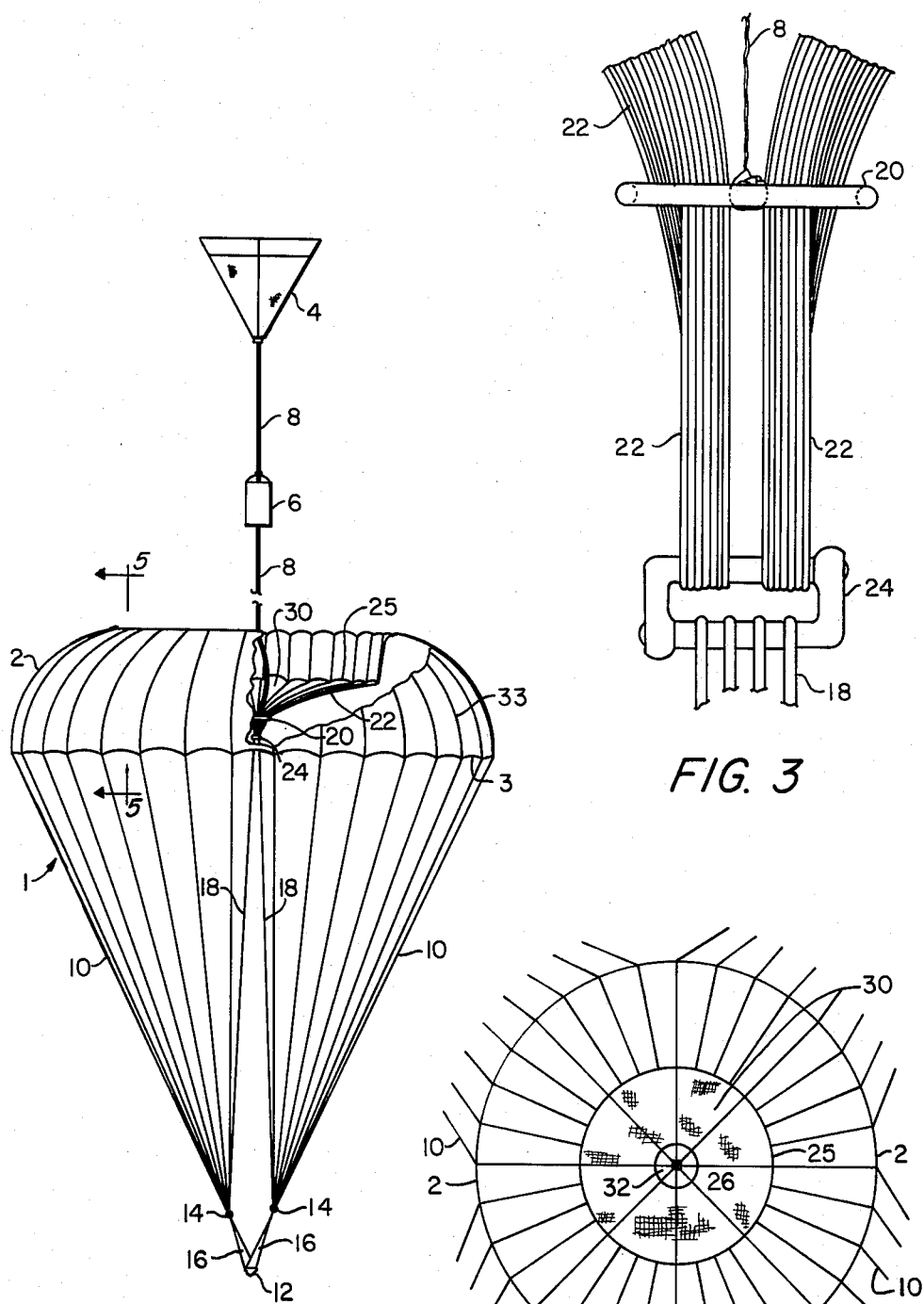
FIG. 3
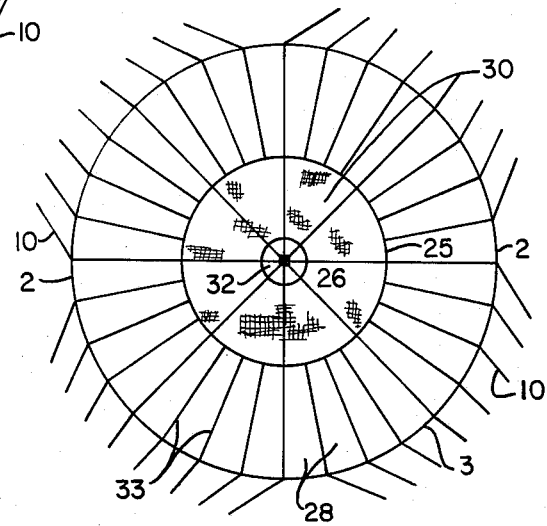
FIG. 1
FIG. 2

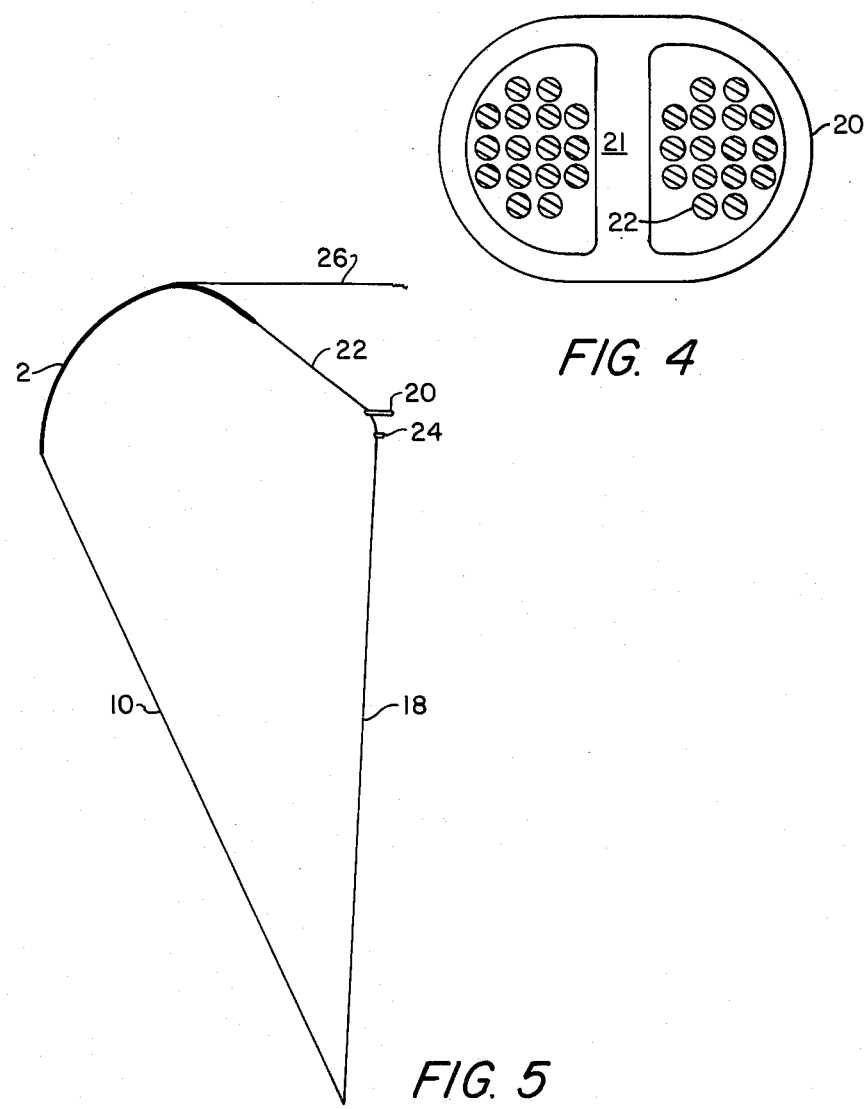

LOW ALTITUDE PARACHUTE SYSTEM

The invention described herein may be manufactured, used, and licensed by or for the Government for governmental purposes without the payment to me of any royalty thereon.

BACKGROUND OF THE INVENTION

This invention relates to an improved annular parachute intended for low altitude deployment of troops at a low rate of descent. A unique system is employed to rapidly inflate the parachute without disastrous overinflation which may lead to such malfunctions as canopy inversions and canopy collapse and without generating excessive opening forces.

It has been found desirable to drop military personnel and military equipment from the lowest possible altitude and at the maximum horizontal velocity in order to reduce exposure to enemy fire. The increased load which today's troops must carry with them when they jump requires that any new parachute must provide a high drag coefficient so as to land the paratrooper at a safe velocity.

The annular ring parachute canopy discussed herein may be compared in configuration to a doughnut having a main vent or opening in the middle. The main vent or opening is covered with netting which does little to impede the passage of air but does prevent other parachutists from becoming entangled in the parachute below them. The problem with prior art annular canopies is that the relatively large central vent allows air to escape almost as quickly as it enters the parachute. This passage of air results in the canopy being slow to inflate with full inflation not being attained until a low critical velocity is reached. Due to the low altitude, from which these parachutes are intended to be dropped, rapid canopy inflation is a necessity.

It has been found that rapid inflation can be achieved by a unique mechanism which holds the main vent closed until the canopy has had a chance to fill with air. This parachute opens rapidly without an opening shock or snap which may lead to canopy inversions and other difficulties such as the failure of parachute lines or canopy materials.

SUMMARY OF THE INVENTION

This invention is concerned with an annular parachute having restraining means to restrain the main vent from opening until sufficient air has filled the canopy. The restraining means comprises a set of axial restrictor lines, connected at one end to the inner edge of the canopy at spaced intervals, which pass through a restrictor ring and connect at the other end to a single connector link. The restrictor ring is connected to a pilot chute by means of a restrictor bridle. When the parachute is packed in its deployment bag, the restrictor ring is positioned next to the vent with the axial restrictor lines extending through the ring. The axial restrictor lines are gathered in two groups, each group going through a separate opening in the restrictor ring which is divided into two openings by a crossbar. Upon deployment of the parachute, the pilot chute, which has a restrictor bridle connected to the crossbar of the restrictor ring, inflates and exerts a force against the crossbar of the restrictor ring briefly holding the main vent closed, allowing the main chute to reach its critical velocity before opening. As the main canopy inflates with air, the vent opens with the restrictor ring restraining this opening to the desired degree. As the vent opens, the two groups of axial restrictor lines separate from each other from the top down, thus pulling the restrictor ring toward the connector link. The pilot chute, connected to the restrictor ring by means of the restrictor bridle, is pulled closer to the main canopy with the movement of the ring. The above-described inflating events of the parachute occur in relatively rapid sequence and may be observed only through slow motion photography.

Another embodiment of this invention employs a modified restraining means to restrict the opening of the main vent. In this embodiment, a series of vent restrictor lines move through a stationary restrictor ring as the main canopy fills with air. A force restraining the opening of the main vent is placed upon the restrictor lines by the pilot chute. As the vent opens, the restrictor lines pass through the restrictor ring, drawing the pilot chute toward the restrictor ring and the canopy.

BRIEF DESCRIPTION OF THE FIGURES

FIG. 1 is a side view partially in section of one embodiment of a deployed inflated parachute according to this invention.

FIG. 2 is a top view of the deployed parachute canopy of FIG. 1.

FIG. 3 is a partial view of the axial restrictor lines passing through the restrictor ring and connected to a connector link of the parachute of FIG. 1.

FIG. 4 is a top view of the restrictor ring used in this invention.

FIG. 5 is a partial cross-section of the parachute canopy shown in FIG. 1

DETAILED DESCRIPTION

Figures 6, 7, 8:
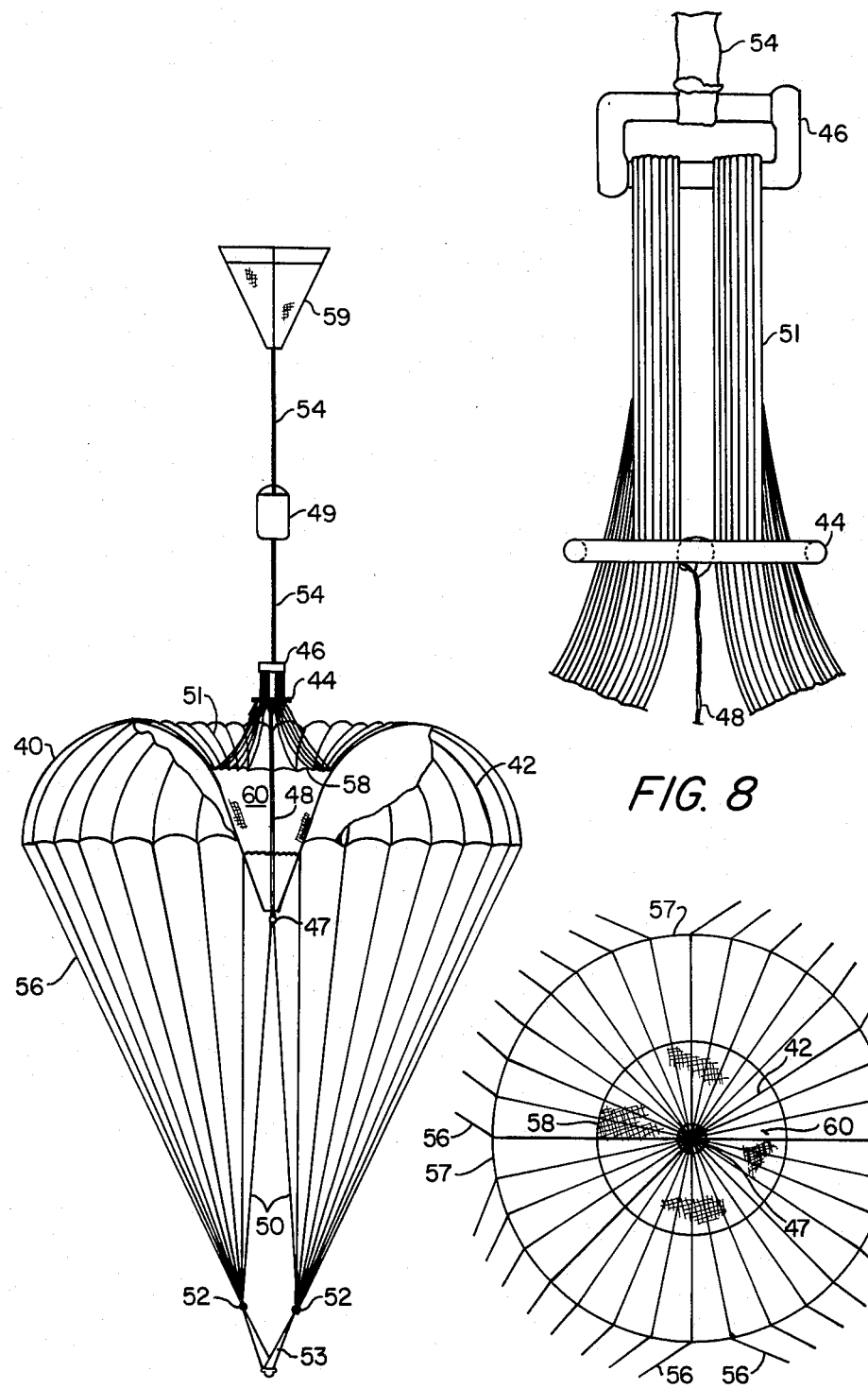
FIG. 6 is a side view partially in section of another embodiment of a deployed parachute.
FIG. 7 is a top view of the deployed parachute canopy of FIG. 6 with the restrictor lines removed for purposes of clarity.
FIG. 8 is a partial view of the axial restrictor lines passing through the restrictor ring and connecting to a connector link of the parachute of FIG. 6.

The parachute of this invention designated generally as 1 has a canopy 2 the drag surface of which may be compared to the top part of a toroid or doughnut which has been cut into two parts along a horizontal plane just below the axis. In FIG. 1, canopy 2 is shown fully deployed with a pilot chute 4 fully deployed. The deployment bag 6 which had enclosed the entire parachute is shown connected to restrictor bridle 8 which is the line connecting the pilot chute 4 to the main parachute. Suspension lines 10 connect canopy 2 to riser links 14. The ends of suspension lines 10 are equally spaced about and attached to skirt 3 of canopy 2 and the opposite ends are attached to riser link 14. There are four identical sets of suspension lines, two are shown in FIG. 1 and two are coming from the rear side of the canopy. In all, there are four sets of suspension lines with each set connected to a riser link 14. Attached to and extending downwardly from the four riser links 14 are two risers 16 (one of which is shown in FIG. 1) which are connected to a conventional parachute harness (not shown) at point 12 holding a load (not shown) which may either be personnel or equipment depending upon the intended use for the parachute.

In FIG. 1, the position of the restrictor ring 20 is illustrated in its position following complete opening of the canopy. This ring is shown with restrictor lines 22 attached to main vent periphery 25 and then passing through the ring to attach to connector link 24. The central vent or opening 30 of the canopy 2 is covered with a net material 26 (shown in FIG. 2) which freely allows the passage of air through the vent. The drag surface of canopy 2 is made of a lightweight nylon material such as that customarily used in parachutes. In the parachutes made according to this description, 1.1 oz. ripstop nylon was used having 80–120 cubic feet/minute porosity. In the parachute made to test the performance of this design, the canopy as shown in FIG. 2 has thirty-two gores 28, with thirty-two suspension lines 10. There are also thirty-two axial restrictor lines 22. The number of gores and the number of lines, is subject to modification. The gores are connected at radial seams 33 by stitching and by a nylon tape (not shown) stitched over the seams to provide reinforcement.

In FIG. 2, there is shown a view of the top of the parachute canopy 2 having thirty-two gore sections 28 which have been sewn or stitched together at seams 33 to form the canopy drag area. Main vent area 30 is covered by a net material 26, which hides from view restrictor lines 22. Eight of seams 33 are shown continuing on the surface of the net material 26 and connect at area 32 in the center of the figure. The net material has a minimal effect on airflow through the vent but has the important purpose of preventing another parachutist or parachute load from dropping through the vent 30 and becoming tangled in the suspension lines 10 or restrictor lines 22.

FIG. 3 shows two sets of axial restrictor lines 22, each set comprising sixteen lines which pass through restrictor ring 20 and connect at one end to connector link 24. As shown in FIG. 1, the other ends of the restrictor lines 22 are attached to and equally spaced about main vent periphery 25 of the canopy. Also shown, are four axial center lines 18 attached at one end to connector link 24 and extending downwardly with each axial center line connecting to a riser link 14 (shown in FIG. 1).

Restrictor bridle 8 is connected at one end to pilot chute 4 and at the other end to the restrictor ring 20. The two sets of axial restrictor lines pull apart with the opening of the canopy causing the restrictor ring 20 to move towards the connector link 24. The restrictor ring movement is restrained by the forces acting on the inflated pilot chute delaying the opening of the main vent 30 allowing the parachute canopy to fill with air.

The restrictor ring 20 illustrated in FIG. 4 is a "double-D" ring. This ring has two openings through each of which a separate set of sixteen restrictor lines 22 pass. As shown in FIG. 3, the restrictor bridle 8 is attached to the crossbar 21 of the restrictor ring 20.

FIG. 5 is a cross section of canopy 2 showing that the canopy material extends further in the direction of the load on the outside perimeter of the canopy than on the inside perimeter of the canopy. This design feature facilitates the flow of air through the vent 30 and lends stability to the parachute during descent.

Prior to deployment of the parachute of FIG. 1, the restrictor ring 20 is drawn upwardly along the restrictor lines 22 to rest against main vent periphery 25 of the canopy 2 essentially closing the main vent 30. Upon deployment of the pilot chute 4, the forces acting on the pilot chute are transmitted through the restrictor bridle 8 to the restrictor ring 20 so as to exert a force on the restrictor ring 20 which briefly holds the ring against the main vent periphery 25 of the canopy preventing the main vent 30 from opening. In this position, the canopy 2 quickly inflates with air and as the canopy inflates it generates radial forces which draw the restrictor lines 10 through the restrictor ring overcoming the force created by the pilot chute allowing the canopy to assume its annular shape or configuration. The opening of the central vent permits a reduction of the opening shock by allowing part of the air mass building up within the canopy to pass through the main vent. In addition, the air mass following the descent of the parachute because of frictional effects can pass through the open main vent. This serves to eliminate the tendency found in rapid opening and decelerating parachutes to invert when maximum inflation of the canopy is achieved. The opening force is also reduced by the growth of the main vent 30 and is controlled by the use of the axial center lines 18 which are formed of a material which will elongate to a greater extent than main suspension lines 10. This causes the axial center lines to absorb more of the opening energy and allows the canopy to expand radially from the center. This redirection of energy through the axial center lines allows the main vent to overexpand, causing a further relief of opening energy.

An advance in parachute technology employed in this parachute system is the use of suspension lines which may be replaced easily. In prior art parachutes, suspension lines are typically stitched a measured distance along the radial seam of the canopy so that it has been necessary to remove the stitching to replace suspension lines. In the parachute described herein a way has been found to provide suspension lines which do not require stitching. The nylon tapes which are stitched to each radial seam 33 are provided with a loop at each end which extends beyond the inner and outer edge of the canopy. The line which is to be attached to the canopy periphery has a similar loop. To attach the line, the loop end of the line is first passed over the loop on the nylon tape, then the opposite end is passed back through that tape's loop and then drawn tight. The result is a snug knot without any sliding along the knot. A line may now be replaced quickly without the need for any special tools and without the need for stitching.

Another embodiment of a quick opening annular ring parachute having suitable properties for a low altitude parachute is shown in FIGS. 6, 7 and 8. In this parachute, instead of having a movable restrictor ring on the restrictor lines, the pilot chute acts on a series of vent restrictor lines to slow the opening of the vent resulting in a rapid parachute inflation. In this embodiment, there is an extended gore with mesh in the main vent area and axial suspension lines which retain the canopy's annular shape. The annular type canopy has a tendency to stream until it reaches a low critical velocity. To increase the critical velocity of the canopy and reduce the filling time, the initial volume of the canopy and size of the main vent must be reduced. Both embodiments of this invention accomplish this purpose.

The embodiment of the parachute shown in FIG. 6 differs from the embodiment shown in FIG. 1 in the mechanism to delay the opening of the main vent. Parachute canopy 40 is shown partially cut away to show restrictor ring 44 and connector link 46. Restrictor bridle 48 is attached at one end to restrictor ring 44 and at the other end to an axial link 47 at a center point in the parachute canopy. Axial center lines 50 connect at one end to axial link 47 and at the other end to riser links 52 which are fastened to risers 53 which support the load (not shown). Bridle 54 attaches at one end to connector link 46 and at the other end to pilot chute 59. Attached to bridle 54 is a deployment bag 49 which encloses the parachute when packed. Suspension lines 56 are attached at one end and equally spaced about the skirt of canopy 40 and attached at the opposite end to riser links 52. Main vent 60 is shown covered by a net material 62 which allows air to freely pass through the vent but prevents objects above the parachute canopy 40 from passing through the vent.

Referring to FIG. 7, there are shown four sets of suspension lines 56 radiating outwardly from canopy 40. 57 is the skirt of canopy 40 and 58 is the main vent periphery, defined by the inner edge of the drag surface of the cloth canopy. Suspension lines 56 are attached at one end to skirt 57 of the canopy and at the other end to riser links 52. Extending inwardly from skirt 57 of the canopy are radial seams 42 which meet in the center of the figure and are joined to axial link 47. Seen inward of main vent periphery 58 is a net material 62 which is under the restrictor lines 51 in this embodiment.

The device which is responsible for restraining the opening of the main vent is shown in FIG. 8. This device contains the same parts as the restraining device shown in FIG. 3 of the first embodiment. The difference in FIG. 8 is that restrictor ring 44 is stationary since it is connected by restrictor bridle 48 to axial link 47 which in turn is connected to the axial center lines 50 (seen in FIG. 6). The restrictor lines 51 pass through restrictor ring 44 and attach to connector link 46 at one end and at the other end attach to a loop on the radial seam at the main vent periphery of the canopy in the same way as the suspension lines are connected to the radial seams. Extending from connector link 46 to the pilot chute (not shown) is bridle 54. In this version of the parachute, the two sets of restrictor lines shown will tend to pull apart as the main vent 60 of the parachute canopy 40 opens. This pulling apart is retarded by the pull of the pilot chute at the other end of the restrictor lines. Since the main vent 60 is not opened as quickly as it would be without this device, the air tends to fill the parachute, instead of spilling through the vent, resulting in a more rapid opening of the parachute.

During deployment, the pilot chute 59 extracts a sleeve or bag 49 from the parachute pack and a suspension line first deployment is accomplished. The main canopy 40 is then released from the sleeve or bag 49. The restrictor ring 44 holds the main vent closed due to restrictor line tension produced by the force acting on the pilot chute. This action of the restrictor ring also reduces the canopy's initial volume, and speeds inflation. As the canopy inflates, the main vent grows larger, thus drawing the restricting lines radially outward normal to the axial line of the canopy, against the drag exerted by the pilot chute. This causes a metering of the inflation process. As canopy inflation continues, the main vent opens to its maximum extent allowing the pressurized air mass under the canopy to pass through the main vent thereby reducing opening shock and allowing the air mass traveling behind the canopy to pass through main vent 60 eliminating the tendency of the canopy to invert or overinflate.

The opening force is also reduced by the growth of the main vent 60 and is controlled by the use of the axial center lines 50 which are formed of a material which will elongate to a greater extent than the main suspension lines 56. This causes the axial center lines to absorb more of the opening energy and allows the canopy to expand radially from the center. This redirection of energy through the axial center lines allows the main vent to overexpand, causing a further relief of opening energy, significantly reducing the possibility of a line over or a "Mae West."

Opening time and force can be varied by changing the location of the restrictor lines along the radial seams. This can also be done by changing the restrictor line "take-up" by varying the length of the restrictor bridle 48. Pilot chute size and bridle length will also influence opening times and forces.

EXAMPLE 1

An annular ring parachute such as shown in FIGS. 1-5 was tested with a 375 pound gross load. The 26.93 feet diameter canopy was constructed of 1.1 oz. nylon ripstop of 80-120 cfm porosity. The distance from the main vent periphery of the canopy on a straight line to the skirt was 8.35 feet and the suspension lines were 30.5 feet long. The parachute and load were dropped from an airplane flying 300 feet above the ground at 150 knots. The canopy was completely open in 0.35 seconds with steady state descent occurring after 1.5 seconds. The terminal velocity was 20 ft/sec.

The parachutes described above are intended for deployment at low altitudes. They have a smaller surface area than prior art parachutes, yet a greater mass may be dropped and landed at a lower velocity than the prior art parachutes. This invention provides a rapid opening annular canopy parachute which is subjected to significantly less opening shock forces than prior art parachutes.

I claim:

1. An annular ring parachute comprising:
    (a) an annular ring parachute canopy having a main vent, said canopy formed of a series of gores which have been sewn together to form the canopy and having a main vent periphery and a skirt;
    (b) suspension lines connected at one end to said skirt and at the other end to risers attached to a load-bearing harness;
    (c) a restraining means connected to said canopy for slowing the opening of said main vent while the canopy of said parachute inflates wherein said restraining means comprises a plurality of restrictor lines with one end of each of said restrictor lines attached at equally spaced intervals around said main vent periphery of the canopy, said restrictor lines passing through a restrictor ring with the other end of each restrictor line attached to a single connector line which in turn is connected to axial center lines, wherein said axial center lines are connected to risers by riser links, said restrictor ring connected to said pilot chute by a restrictor bridle and
    (d) a pilot chute connected to said restraining means and adapted when inflated to apply a force to said restraining means to slow the opening of said main vent.

2. A parachute as recited in claim 1 wherein said restrictor ring has a crossbar dividing the ring into two equal-sized sections, said restrictor bridle being attached to said crossbar and an equal number of said restrictor lines running through each of said sections of the ring.

3. A parachute as recited in claim 2 wherein said restrictor ring is positioned adjacent to said main vent periphery of the canopy prior to canopy deployment and adapted to move along the restrictor lines away from said main vent periphery as the canopy inflates.

4. A parachute as recited in claim 3 wherein a layer of net material is attached to said canopy and covers the main vent.

5. A parachute as recited in claim 4 wherein said restrictor ring and said pilot chute move toward said connector link during inflation of said canopy.

6. An annular ring parachute comprising:
   (a) an annular ring parachute canopy having a main vent, said canopy formed of a series of gores which have been sewn together to form the canopy and having a main vent periphery and a skirt,
   (b) suspension lines connected at one end to said skirt and at the other end to risers attached to a load-bearing harness,
   (c) a restraining means connected to said canopy for slowing the opening of said main vent while the canopy of said parachute inflates wherein said restraining means comprises a plurality of restrictor lines attached at one end to and equally spaced about said main periphery of the canopy passing through a restrictor ring and connected at the other end to a connector link connected to said pilot chute by a bridle, said restrictor ring connected to an axial link by a restrictor bridle, and
   (d) a pilot chute connected to said restraining means and adapted when inflated to apply a force to said restraining means to slow the opening of said main vent.

7. A parachute as recited in claim 6 wherein a restrictor bridle connects the restrictor ring to the axial link, said axial link connecting the restrictor bridle to a plurality of axial center lines.

8. A parachute as recited in claim 7 wherein prior to canopy deployment said main vent periphery of the canopy is positioned next to said restrictor ring.

9. A parachute as recited in claim 8, wherein said pilot chute restrains the passage of the restrictor lines through the restrictor ring, said restrictor lines acting to restrict the opening of the main vent.

10. A parachute as recited in claim 9 wherein net material covers the main vent, said restrictor lines being between the net material and the connector link.

11. A parachute as recited in claim 10 wherein said restrictor ring remains stationary during deployment of the parachute canopy while the restrictor lines pass through the restrictor ring.

12. A parachute as recited in claim 11 wherein during deployment of the parachute canopy, the connector link and pilot chute move towards the restrictor ring and the main parachute canopy.

* * * * *